May 23, 1944. B. LAMBERGER 2,349,504
APPARATUS FOR INSTRUCTIONS IN DRAWING
Filed July 17, 1942
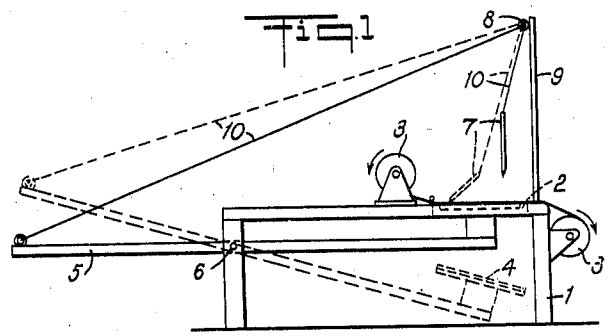
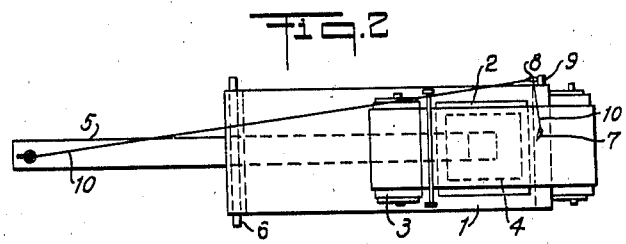
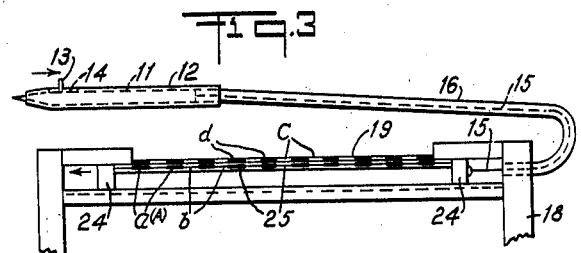
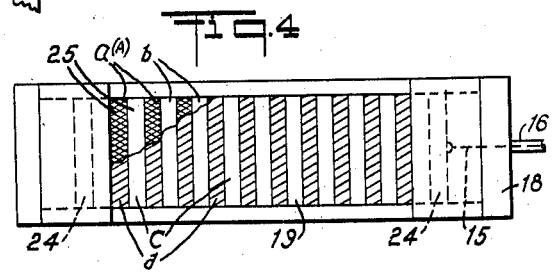
INVENTOR.
BRUNO LAMBERGER
ATTORNEYS Patented May 23, 1944

2,349,504

UNITED STATES PATENT OFFICE 2,349,504

APPARATUS FOR INSTRUCTION IN DRAWING

Bruno Lamberger, Gwelo, Southern Rhodesia, Union of South Africa

Application July 17, 1942, Serial No. 451,253

7 Claims. (Cl. 35—26)

The object of the invention is an apparatus for instruction in drawing or painting. A practical way of learning how to draw a given object, is to learn to visualize this object on the drawing-surface and then to trace the lines of this imaginary picture.

The methods known of instruction in drawing make use of models, drawing-copies and tracing-books. In using models and drawing-copies, the pupil does not learn to visualize the picture on the plain drawing-surface, as he never sees, how the model or picture would appear on the drawing-surface before he starts to draw. On the other hand, when using tracing-books, he sees the object on the drawing-paper but the purpose of learning is not achieved, the design being simply traced after visible lines instead of being traced after imaginary lines.

Now, according to the invention, a new apparatus is used for the purpose of learning to draw. When using this apparatus according to the invention, the drawing-copy, model etc. is to be seen on or through the drawing-surface only until the pupil starts to draw or to paint, and at that moment the drawing-copy disappears. The main advantage of such an arrangement consists in inducing the pupil to visualize the object on the same spot on which he has to draw it and in the proportions of the intended drawing. The use of such an apparatus affords an easy learning without making copy-work necessary by which the faculty of imagination is not developed.

Some accomplishments of the new apparatus are shown as examples in the accompanying drawing. Fig. 1 represents the apparatus in side elevation and Fig. 2 in plan view. The Figures 3 and 4 show another example of the invention in side elevation and plan view.

According to Figures 1 and 2 in the upper part of the frame 1 of the apparatus an opening 2 is provided, above which the drawing-surface is arranged—which may be a portion of a paper roll 3—either on a glassplate or stretched over the opening without support. Preferably, half-transparent tracing-paper should be used. The drawing-copy 4 is fixed on the right end of an arm 5 which can swing round an axis 6. On the left end of the arm a string, cable or the like 10 is fixed; the other end of the string being connected to a pencil 7 or other instrument for drawing, painting or writing. The string is preferably led through a ring 8 which is fixed on an arm 9. According to the invention the apparatus is used in the following manner:

When the left end of the arm 5 is pressed down, the arm swings round the axis 6 in such a way that the drawing-copy, being pressed from below against the drawing-surface, becomes visible through the tracing-paper. At the same time the pencil is being lifted from the drawing-surface by a pull of the string that is fixed on the left end of the arm. The string is of such a length that the pencil cannot be brought down to the tracing-paper when the arm 5 is in the position shown in full lines in Fig. 1. To start drawing the left end of the arm 5 is lifted whereby the arm swings in such a way that the drawing-copy is moved so far from the drawing-surface that it cannot be seen anymore through the half transparent tracing-paper. Simultaneously, the left end of the arm is sufficiently lifted to allow the pencil to be brought down to the drawing-surface, ready for use. Thus it is impossible for the pupil to see the drawing-copy and to draw at the same time. When the drawing implement 7 is removed or raised away from the paper, the table 5 again returns to a position in which the drawing thereon is rendered visible.

According to the example represented in Figures 3 and 4 the disappearing of the drawing-copy etc. is regulated by a special mechanism directly connected to the pencil etc. According to Fig. 3 a pencil, fountain pen or the like 11 is provided with a pin 13 and arranged in a tube 12 which is longer than the pencil or pen. The pin 13 is projecting through a longitudinal opening 14 of the tube 12. To one end of the pencil or fountain pen 11 a wire 15 is connected which is arranged in a flexible tube 16. One end of the tube 16 is fixed on to the tube 12 and the other end is secured to a frame, table or the like 18, the wire being connected to the pictureframe 24. The pictureframe 24, holding the drawing-copy, may only be moved parallel to the drawing-surface between two parallel parts of the frame 18.

The drawing copy 25 is preferably a certain kind of known trick-pictures, i. e. a normal picture interrupted by parallel white strips. Consequently the picture A consists of parallel picture strips $a$ separated by white strips $b$ of the same width. The width of the strips is so small that the interruption is hardly perceptible.

In the arrangement shown in Figs. 3—4 instead of tracing-paper preferably a half-transparent Celluloid plate 19 is used as a drawing surface. The upper side of the plate used for drawing is rough, the other smooth. The Celluloid plate is provided with parallel white strips d which are not transparent, and which correspond in width and distance exactly with the strips of the picture 25. The transparent strips of the Celluloid plate 19 are marked in Figs. 3 and 4 with c and are of the same width as the strips a, b and d. The picture 25 (i. e. the drawing-copy) is fixed directly underneath the drawing-plate in the picture-frame 24 which can change its position only by the width of one strip.

When the pupil wants to see the picture that he intends to draw he moves the pin 13 with the pencil to which it is attached in the direction of the arrow thereby pushing by means of a wire 15 the picture-frame 24 with the drawing-copy 25 to the left so that now the picture A i. e. the strips a become visible through the transparent strips c of the Celluloid plate 19 which is in a fixed position. Now the pencil or the like 11 cannot be used because its point is inside the tube 12.

When the pupil wants to start drawing, he has to bring back the pin in its original position, as shown in Fig. 3 whereby the pencil is pushed forward to its normal position, ready for use and the picture-frame 24 with the picture 25 is pulled to the right—for the width of one strip only. The drawing-copy 25 hereby returns into a position with all picture strips a covered by the white non-transparent strips of the Celluloid plate. Only the white strips b of the picture 25 are visible, offering together with the white strips d of the Celluloid plate to the pupil a drawing surface of uniform whiteness.

For the above arrangement a known trick-picture can be used that shows instead of empty white strips b other picture-strips which form a second picture that is not intended to be copied but, as it appears after the disappearance of picture A, remaining visible during the act of drawing, it represents an obstacle for the pupil that has to be overcome when visualizing the first picture A, the object of the drawing. This arrangement is intended for advanced pupils, to render the visualizing more difficult.

Another way to carry out the inventional idea is to use two Celluloid plates with transparent and non-transparent strips as described with reference to Figs. 3 and 4. One plate is arranged underneath the other so that by moving the lower plate in such a way that the transparent strips of both plates cover each other, a drawing-copy or a model becomes visible through the plates, either directly or in a mirror underneath the drawing-surface.

It will be seen from the above, that the invention provides means under the control of the pupil for eliminating a drawing from such visible position that it could be copied and for returning it to display position. The means for moving the drawing relatively to the paper or other material on which it is to be copied, are under control of the pupil, and the means for removing the drawing from display position become effective wherever the pupil moves a drawing implement to that operative position with respect to the copying surface in which the drawing could have been traced if it had remained. Also the pupil controlled means in one embodiment include a drawing implement with relatively movable parts for rendering the implement operative or inoperative respectively. Whenever the parts are moved to render the implement operative, the drawing which is to be copied is caused to disappear.

What I claim is:

1. Educational device for teaching drawing or painting, including a support for holding a drawing to be copied on display, a copying surface and pupil controlled means for eliminating the drawing from display, and for returning it to display, said pupil controlled eliminating means becoming effective whenever the pupil moves a drawing implement to that operative position with respect to said copying surface, in which position the drawing could have been traced onto said copying surface if it had been displayed on said support.

2. An educational device for teaching drawing or painting, including a support for a copying surface, a support for holding a drawing in a position ready for being traced on said copying surface, a drawing implement a support for holding the drawing implement in inoperative position, and means interposed between said drawing implement and said support for the drawing for moving said support to a position in which said drawing is removed from the copying surface when said drawing implement is supported in operative condition and is returnable to the tracing position whenever the implement is supported in inoperative position.

3. An educational device for teaching drawing or painting, including a support for a copying surface, a second support for a drawing to be copied, said second support being movable relatively to the support for the copying surface, a drawing implement and flexible means for attaching said drawing implement to said second support in such manner that upon rendering said drawing implement operative the second named support is moved to inoperative position with respect to said copying surface and upon rendering said drawing implement inoperative, the second named support is moved to display position for the drawing to be copied.

4. An educational device for teaching drawing or painting, including a support for holding a transparent copying surface, a support for holding a drawing to be copied on display beneath said copying surface so as to be traceable through said transparent copying surface, and means connected with a student controlled drawing implement for moving said drawing to a position of concealment with respect to said transparent copying surface, when said pupil manipulated drawing implement is rendered operative with respect to said copying surface.

5. An educational device for teaching drawing or painting, including a support for a transparent copying surface having opaque portions thereon, a drawing to be copied, means for supporting said drawing with respect to said transparent copying surface in such position that predetermined portions of the drawing are traceable through said copying surface, a pupil controlled drawing implement, and means connected with said drawing implement for positioning the support of the drawing with respect to the support for the copying surface in such relation that the portions of the drawing previously visible through the transparent portions of the copying surface are covered by the non-transparent portions of the copying surface.

6. An educational device for teaching drawing or painting, including a support for holding a transparent copying surface, said transparent copying surface being divided by opaque transverse strips into parallel zones of transparency and opaqueness, a drawing to be copied, said drawing also being divided into transverse zones of subject matter of the drawing alternating with parallel zones left free of subject matter, a support for said drawing for holding said drawing in such position with respect to the copying surface that the opaque zones of the copying surface register with the vacant zones on the drawing, a drawing implement controlled by the pupil, a pupil controlled means on the drawing implement for producing relative movement between said copying surface support and said drawing support to move the vacant zones on the drawing into and out of registry with the transparent zones on the copying surface, whereby during the copying operation, the subject matter of the drawing remains concealed by the opaque portions of the copying surface and the vacant zones of the drawing are displayed through the transparent zones of the copying surface.

7. An educational device for teaching drawing or painting, including a support for holding a drawing to be copied on display, a copying surface relatively movable to said support, a drawing implement adapted to be moved to operative and inoperative position respectively, and pupil controlled means for eliminating the drawing from display and returning it to display, said pupil controlled eliminating means being adapted to induce relative movement between said support and copying surface whenever the pupil renders the drawing implement operative.

BRUNO LAMBERGER.